(12) United States Patent
Adams et al.

(10) Patent No.: US 10,808,764 B2
(45) Date of Patent: Oct. 20, 2020

(54) BEARING ASSEMBLY

(71) Applicant: G.B.G.I., INC., Chardon, OH (US)

(72) Inventors: Marc T. Adams, Burton, OH (US); Peter T. Casamento, Solon, OH (US)

(73) Assignee: G.B.G.I., Inc., Chardon, OH (US)

( * ) Notice: Subject to any disclaimer, the term of this patent is extended or adjusted under 35 U.S.C. 154(b) by 19 days.

(21) Appl. No.: 16/140,021

(22) Filed: Sep. 24, 2018

(65) Prior Publication Data

US 2019/0093707 A1 Mar. 28, 2019

Related U.S. Application Data

(60) Provisional application No. 62/563,410, filed on Sep. 26, 2017.

(51) Int. Cl.

| | |
|---|---|
| *F16C 33/78* | (2006.01) |
| *F16C 35/04* | (2006.01) |
| *F16C 19/06* | (2006.01) |
| *A01B 71/04* | (2006.01) |
| *F16C 43/04* | (2006.01) |
| *F16C 19/54* | (2006.01) |
| *F16C 33/72* | (2006.01) |
| *F16C 19/08* | (2006.01) |

(52) U.S. Cl.
CPC .......... *F16C 33/7886* (2013.01); *A01B 71/04* (2013.01); *F16C 19/06* (2013.01); *F16C 19/54* (2013.01); *F16C 33/723* (2013.01); *F16C 33/782* (2013.01); *F16C 33/7869* (2013.01); *F16C 35/042* (2013.01); *F16C 43/045* (2013.01); *F16C 19/08* (2013.01); *F16C 2310/00* (2013.01)

(58) Field of Classification Search
CPC .... F16C 2310/00; F16C 35/07; F16C 35/073; F16C 33/723; F16C 33/7823; F16C 33/7883; F16C 33/7889; F16C 33/7869; F16C 33/7886; F16C 33/782; F16C 43/045; F16J 15/164; F16J 15/346
See application file for complete search history.

(56) References Cited

U.S. PATENT DOCUMENTS 2,783,103 A * 2/1957 Hamilton ............... A01B 15/16
384/460
4,136,746 A * 1/1979 Tusing .................. A01B 71/04
172/599

(Continued)

*Primary Examiner* — Alan B Waits
(74) *Attorney, Agent, or Firm* — Sand, Sebolt & Wernow Co., LPA

(57) ABSTRACT

A bearing assembly engaged with an end of a rotatable shaft. The assembly includes a hub defining a first bore extending between a first opening at a first end of the hub and a second opening at a second end of the hub. A bearing sleeve engaged in the first bore defines a second bore. The shaft's end is inserted through a first opening in the second bore. A sealed bearing located between the bearing sleeve and the hub's interior surface enables relative rotation therebetween. A first sealing mechanism seals the first bore's first opening and a second sealing mechanism seals the second openings of both of the first and second bores. The first sealing mechanism includes an L-shaped ring circumscribing the bearing sleeve and a rubber sealing member. The second sealing mechanism includes a hemispherical region and flange secured to the hub by a retaining ring.

20 Claims, 7 Drawing Sheets

(56) References Cited

U.S. PATENT DOCUMENTS

| | | | | |
|---|---|---|---|---|
| 4,572,516 | A | * | 2/1986 | Symons ................ F16J 15/164 |
| | | | | 277/377 |
| 5,129,744 | A | * | 7/1992 | Otto .................... B21B 31/078 |
| | | | | 277/351 |
| 5,328,275 | A | * | 7/1994 | Winn ................... B60B 27/001 |
| | | | | 384/472 |
| 6,840,679 | B2 | | 1/2005 | Lenick et al. |
| 7,073,949 | B2 | * | 7/2006 | Ruckle ................. A01B 71/04 |
| | | | | 172/394 |
| 7,258,491 | B2 | | 8/2007 | Gutowski et al. |
| 7,306,375 | B2 | | 12/2007 | Lenick et al. |
| 9,157,475 | B2 | | 10/2015 | Gutowski et al. |
| 9,316,260 | B2 | | 4/2016 | Smith et al. |

\* cited by examiner

BEARING ASSEMBLY

CROSS-REFERENCE TO RELATED APPLICATIONS

This application claims the benefit of U.S. Provisional Patent Application Ser. No. 62/563,410, filed Sep. 26, 2017, the entire disclosure of which is incorporated herein by reference.

BACKGROUND

Technical Field

The present disclosure is directed generally to farm and landscaping equipment. More particularly the present disclosure relates to a bearing assembly for equipment, such as tilling equipment that includes a rotatable shaft. Specifically, the present disclosure is directed to a bearing assembly including a dust cap on one side of the bearing and a seal on the other side of the bearing; where the dust cap and seal aid in preventing soil and other contaminants from entering into the bearing assembly and thus slowing or halting rotation of a shaft engaged with the bearing assembly.

Background Information

A number of types of farm or landscaping equipment include attachments that rotate about an axis. One type of attachment is a tilling attachment that includes blades or tilling implements that extend outwardly from a rotatable shaft. The tilling attachment includes a housing that has opposed first and second arms and each end of the shaft is engaged with one of the first and second arms via a bearing assembly. The bearing assembly enables the shaft to rotate smoothly as the farm or landscaping equipment moves forwardly to work the soil.

One of the issues experienced with this type of system is that debris such as dust, soil, plant matter, and small stones may enter into the bearing assembly during use of the attachment. This debris can build up in the housing of the bearing assembly and around an end of the shaft engaged therewith. The built-up debris may slow and ultimately stop rotation of the bearing assembly. If the bearing assembly is slowed or prevented from rotating then the shaft engaged therewith is also slowed or prevented from rotating.

U.S. Pat. No. 9,316,260 to Smith et al discloses a bearing assembly that partially addresses this issue. The Smith et al bearing assembly includes first and second races that are separated from each other by a gap. A ball bearing is retained within this gap to permit relative rotation between the first and second races. A seal extends from the second race towards the first race and this seal includes flexible protrusions that press against the first race and seal off the gap. The seal seals off the ball bearing and thereby aids in ensuring that dust and debris do not stop the ball bearing from enabling movement between the first and second races. One of the shortcomings of the Smith et al bearing assembly is that dust, debris and plant material are still able to build up within a bore of the bearing assembly and may therefore ultimately prevent the shaft that extends through that bore from rotating. The bearing assembly may become damaged or worn out, and may result in the farmer or landscaper having to disassemble the tilling equipment to clean out the bore or replace the bearing assembly. Cleaning the bearing assembly or replacing the same can be a time consuming and laborious task.

SUMMARY

There is therefore a need in the art for an improved bearing assembly that has a reduced tendency to allow soil, plant material, and small stones to enter an interior of the bearing assembly.

A bearing assembly engaged with an end of a rotatable shaft is disclosed herein and the disclosed bearing assembly addresses at least some of the aforementioned issues. The bearing assembly includes a hub defining a first bore extending between a first opening at a first end of the hub and a second opening at a second end of the hub. A bearing sleeve engaged in the first bore defines a second bore. The shaft's end is inserted through a first opening in the second bore. A sealed bearing located between the bearing sleeve and the hub's interior surface enables relative rotation therebetween. A first sealing mechanism seals the first bore's first opening and a second sealing mechanism seals the second openings of both of the first and second bores. The first sealing mechanism includes an L-shaped ring circumscribing the bearing sleeve and a rubber sealing member. The second sealing mechanism includes a hemispherical region and flange secured to the hub by a retaining ring.

In one aspect, the present disclosure may provide a bearing assembly comprising a hub having an interior surface that defines a first bore; wherein a first end of the hub defines a first opening to the first bore and a second end of the hub defines a second opening to the first bore; a bearing sleeve having an interior surface that defines a second bore, wherein a first end of the bearing sleeve defines a first opening to the second bore; and a second end of the bearing sleeve defines a second opening to the second bore; wherein the bearing sleeve is received in the first bore such that the first end of the bearing sleeve is proximate the first end of the hub; and wherein the bearing sleeve is adapted to receive a first end of a rotatable shaft in the second bore; at least one bearing positioned in the first bore between a portion of the bearing sleeve and a portion of the interior surface of the hub; a first sealing mechanism provided at the first end of the hub; and a second sealing mechanism provided at the second end of the hub; wherein said second sealing mechanism seals off the second opening to the first bore and the second opening to the second bore.

In another aspect, the present disclosure may provide in combination a rotatable shaft having an exterior surface, a first end and a second end; and a bearing assembly that is engaged with the first end of the shaft; wherein said bearing assembly comprises a hub having an interior surface that defines a first bore that extends from a first opening at a first end of the hub to a second opening at a second end of the hub; a bearing sleeve engaged in the first bore; said bearing sleeve having an interior surface that defines a second bore that extends from a first opening in a first end of the bearing sleeve to a second opening in a second end of the bearing sleeve; wherein the first end of the shaft is receivable in the first opening to the second bore; and wherein a portion of the shaft extends for a distance outwardly beyond the second opening to the second bore; at least one bearing located in the first bore between the bearing sleeve and the interior surface of the hub; said at least one bearing enabling relative rotation between the bearing sleeve and the hub; a first sealing mechanism provided at the first end of the hub; said first sealing mechanism sealing the first opening to the first bore that circumscribes an exterior surface of the bearing sleeve; and a second sealing mechanism provided at the second end of the hub; said second sealing mechanism sealing both the second opening to the first bore and the second opening to the second bore.

In another aspect, the first sealing mechanism comprises an L-shaped annular ring seated in the first bore and having a first leg and a second leg that meet at a corner; wherein the first leg extends between the exterior surface of the bearing sleeve and the interior surface of the hub; and a V-shaped sealing member engaged in the corner of the L-shaped annular ring; wherein the V-shaped sealing member comprises a first region and a second region; wherein the second region is oriented at an angle relative to the first region and contacts a section of the interior surface of the hub that is oriented parallel to the first leg of the L-shaped annular ring.

In yet another aspect, the second sealing mechanism comprises a dust cap having a hemispherical region and an annular flange extending radially outwardly from a base of the hemispherical region; and wherein the flange is engaged with the hub such that the hemispherical region extends convexly outwardly for a distance from the second end of the hub.

In another aspect, the present disclosure may provide a method of mounting a rotatable shaft to a mounting bracket; said method comprising steps of providing a bearing assembly having a hub defining a first bore therethrough and a bearing sleeve seated in the first bore; positioning a sealed bearing in the first bore between an interior surface of the hub and an exterior surface of the bearing sleeve; providing a rotatable shaft having an exterior surface, a first end, and a second end; inserting the first end of the shaft into a first opening to a second bore, where the first opening to the second bore is defined in a first end of the bearing sleeve; sealing off a first opening to the first bore at a first end of the hub using a first sealing mechanism that circumscribes an exterior surface of the first end of the bearing sleeve; and preventing dust, soil, or plant material from entering the first opening to the first bore using the first sealing mechanism.

In another aspect the method may further comprise engaging a second sealing mechanism with a second end of the hub; sealing off, with the second sealing mechanism, a second opening to the first bore, where the second opening to the first bore is defined in the second end of the hub; sealing off, with the second sealing mechanism, a second opening to the second bore, where the second opening to the second bore is defined in a second end of the bearing sleeve; and preventing dust, soil, or plant material from entering the second opening to the first bore using the second sealing mechanism.

In another aspect, the method may further comprise extending the first end of the shaft beyond the second end of the bearing sleeve; and preventing access to the first end of the shaft with the second sealing mechanism.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
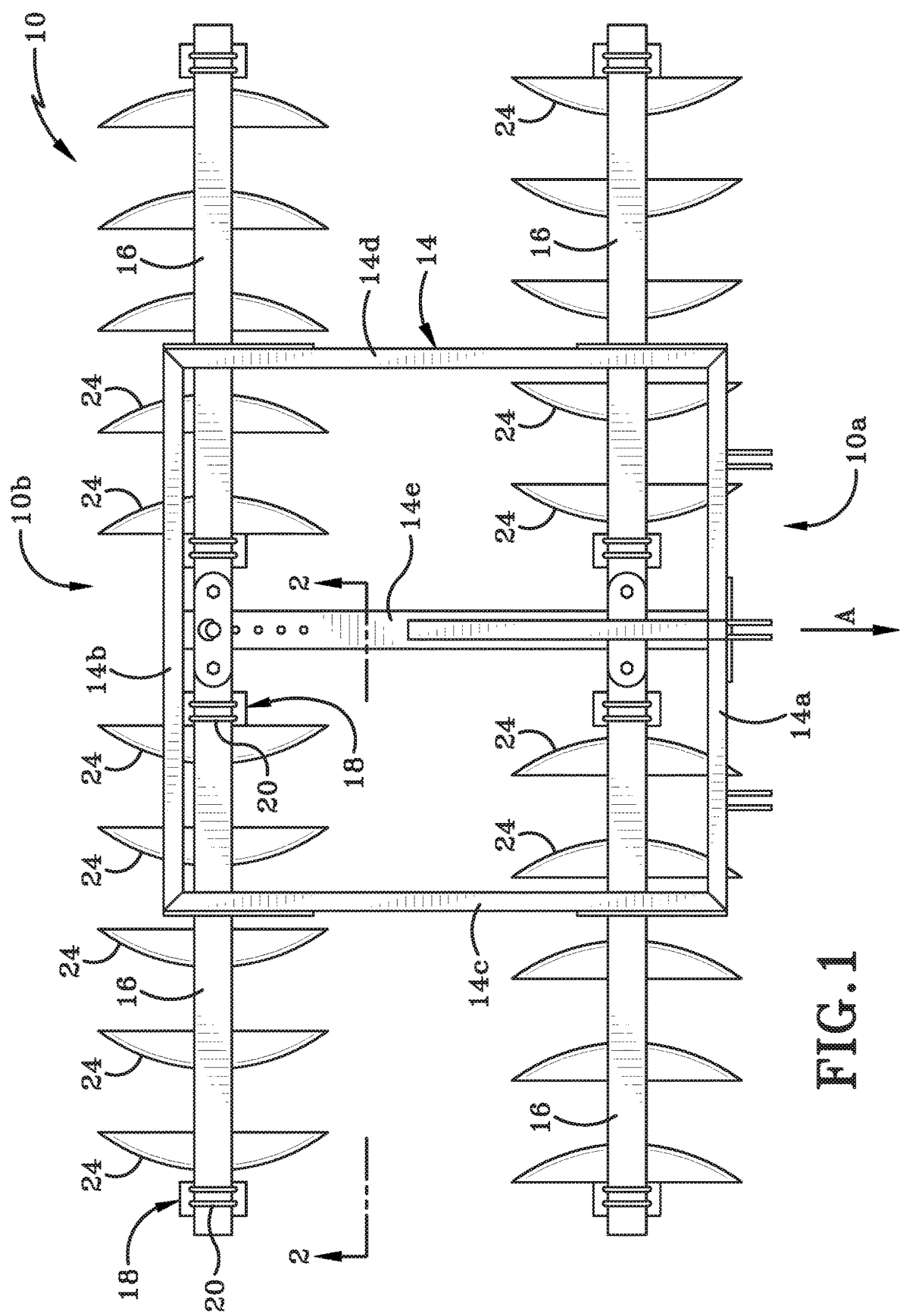
FIG. 1 is a top plan view of rotary tilling equipment that may be engaged with a tractor; where the tilling equipment utilizes a bearing assembly in accordance with the present disclosure.
Figure 2:
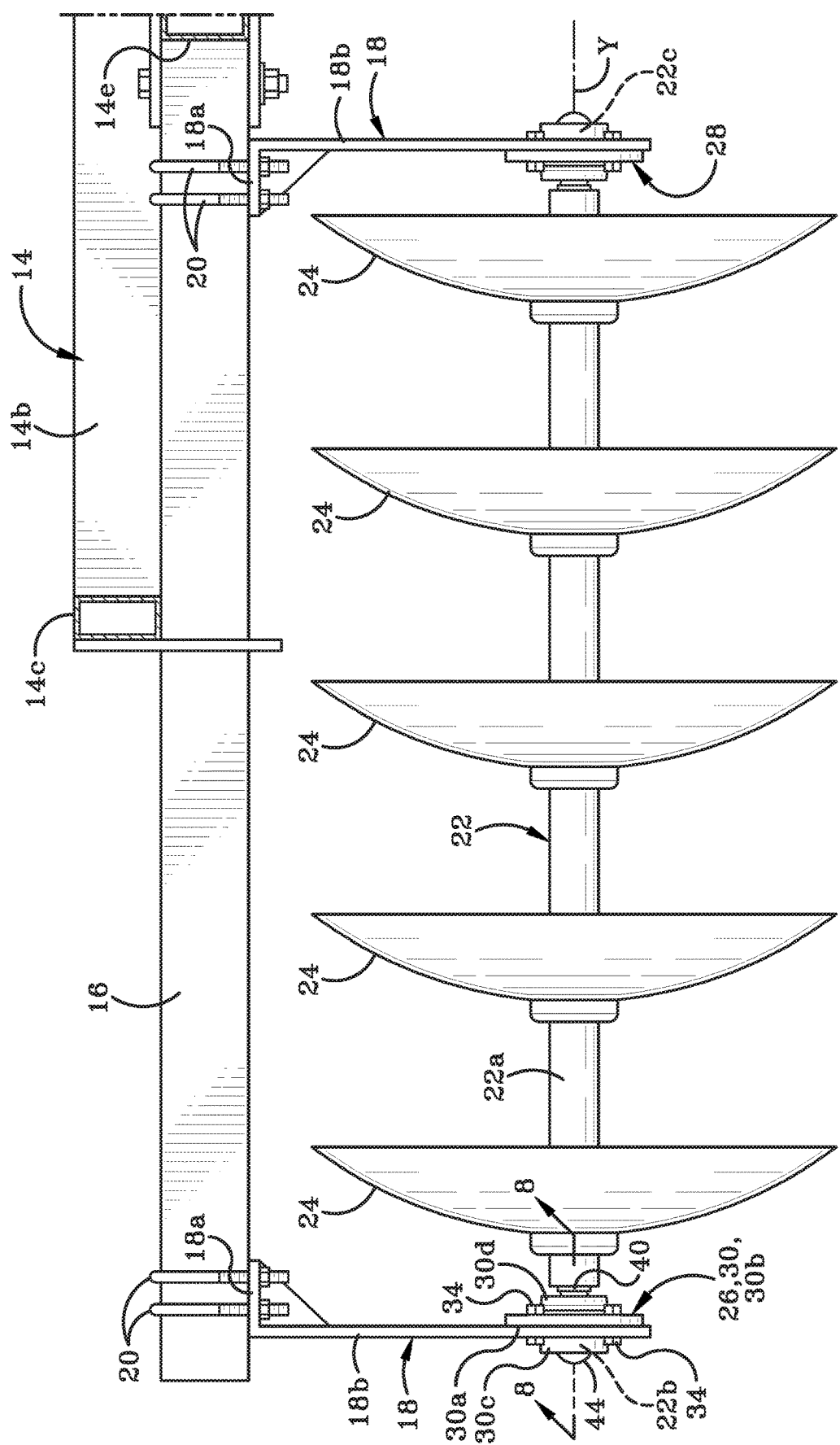
FIG. 2 is a partial front elevation view of the rotary tilling equipment taken along line 2-2 of FIG. 1 and showing two bearing assemblies in accordance with the present disclosure.

FIGS. 1 and 2 show an attachment 10 for equipment farm or landscaping equipment. Attachment 10, as illustrated, may be an example of a type of rotary tilling equipment that may utilize a bearing assembly in accordance with the present disclosure. The attachment 10 is indicated as having a front end 10a and a rear end 10b that define a longitudinal direction between them. Attachment 10 may be, by way of example only, a disc gang attachment that includes a frame 14 having a plurality of frame members 14a, 14b, 14c, 14d, and 14e. Frame member 14a may be located proximate front end 10a of attachment 10 and may be operatively engaged with a vehicle that is capable of towing attachment 10. When attachment 10 is towed by the towing vehicle, attachment 10 may move in the direction indicated by arrow "A" (FIG. 1).

Attachment 10 may further comprise one or more crossbars 16 that may be engaged with and extend outwardly from frame 14. The angular orientation of crossbars 16 relative to frame 14 may be adjusted. As illustrated in FIG. 1, the crossbars 16 may be arranged in substantially parallel rows that may be disposed at right angles to the direction of motion "A" of the tractor or other towing vehicle with which the attachment 10 may be engaged. Although not illustrated herein, it will be understood that one or more of crossbars 16 may be moved into a position where the one or more crossbars 16 may be oriented at an angle other than ninety degrees relative to the direction of motion "A".

Referring to FIG. 2, attachment 10 may further comprise a plurality of mounting brackets 18 that may be engaged with at least one of the crossbars 16. Each mounting bracket 18 may be a generally L-shaped component when viewed from a front end or a rear end of attachment 10 (such as is illustrated in FIG. 2). Each mounting bracket 18 may include a first leg 18a and a second leg 18b that may be oriented generally at right angles to each other. First leg 18a may be engaged with crossbar 16 by way of one or more clamping rods 20. In other instances, first leg 18 may be secured to crossbar 16 by any other suitable method or type of fastener.

For example, first leg 18a may be welded to crossbar 16 or may be secured thereto utilizing bolts with associated nuts and washers.

Still referring to FIG. 2, attachment 10 may further comprise a shaft 22 and one or more rotary tilling discs 24 that may be mounted or otherwise provided on shaft 22. (Instead of one or more rotary tilling discs 24, one or more of any other tilling implement, cutting implement, and harvesting implement may be mounted or otherwise provided on shaft 22.) Shaft 22 may be mounted between two spaced-apart mounting brackets 18. In particular, shaft 22 may be mounted between the second legs 18b of two spaced-apart mounting brackets 18. Still further, shaft 22 may be mounted to the second legs 18b by a suitable mechanism that permits shaft 22 to rotate about an axis "Y" that extends along shaft 22. Axis "Y" may be oriented at ninety degrees to the direction of movement "A" of the towing vehicle, depending on an orientation of crossbars 16. If crossbars 16 are adjusted to be oriented at an angle other than ninety degrees relative to direction of movement "A", then axis "Y" may be similarly angled relative to the direction of movement "A".

Still referring to FIG. 2, shaft 22 may be an elongate tubular member having an exterior circumferential surface 22a, a first end 22b (FIGS. 2 & 8) and a second end 22c (FIG. 2). The one or more rotary discs 24 may extend generally radially outwardly from surface 22a and therefore may be oriented generally at right angles to longitudinal axis "Y". A region of shaft 22 proximate first end 22b and a region of shaft 22 proximate second end 22c may be of a reduced diameter. The reduced diameter first and second ends 22b, 22c of shaft 22 may each be operatively engaged with a bearing assembly in accordance with the present disclosure. A first bearing assembly 26 may be operatively engaged with first end 22b of shaft 22 and with a first mounting bracket 18. A second bearing assembly 28 may be operatively engaged with second end 22c of shaft 22 and with the second mounting bracket 18. In particular, each bearing assembly 26, 28 may be secured to the second leg 18b of one of the two spaced-apart mounting brackets 18 and the shaft 22 may be operatively engaged with the bearing assemblies 26, 28. The bearing assemblies 26, 28 may be provided to enable shaft 22 to more readily and easily rotate about the axis "Y" relative to mounting brackets 18. First and second bearing assemblies 26, 28 may be substantially identical to each other and each bearing assembly 26, 28 may be mounted to the second legs 18b of the spaced apart mounting brackets 18 in such a way that bearing assemblies 26, 28 mirror each other.

Only first bearing assembly 26 will be described in greater detail hereafter but It will be understood, however, that second bearing assembly 28 is of a substantially identical structure and function to first bearing assembly 26.

Figure 3:
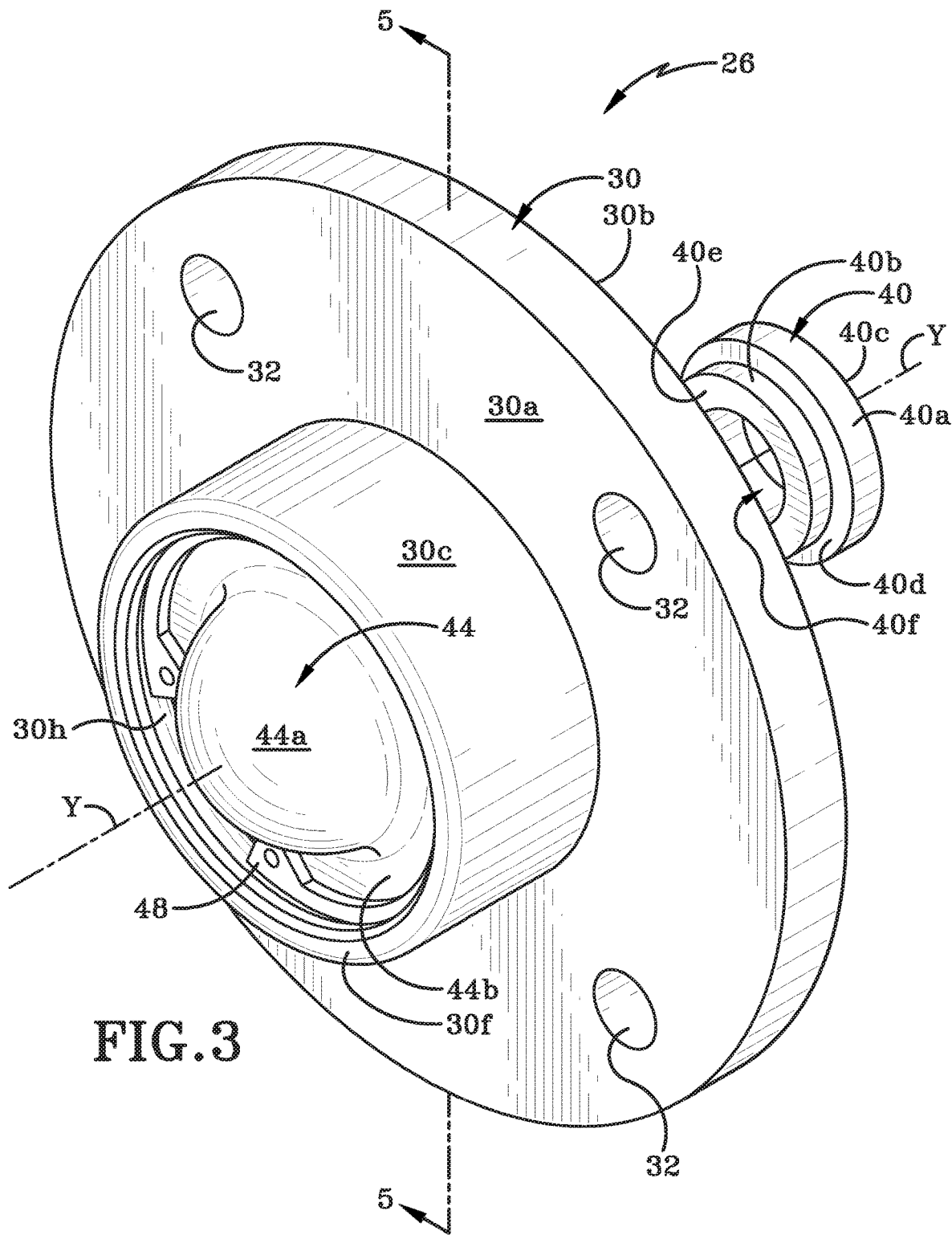
FIG. 3 is a perspective view of a first side of the bearing assembly.
Figure 4:
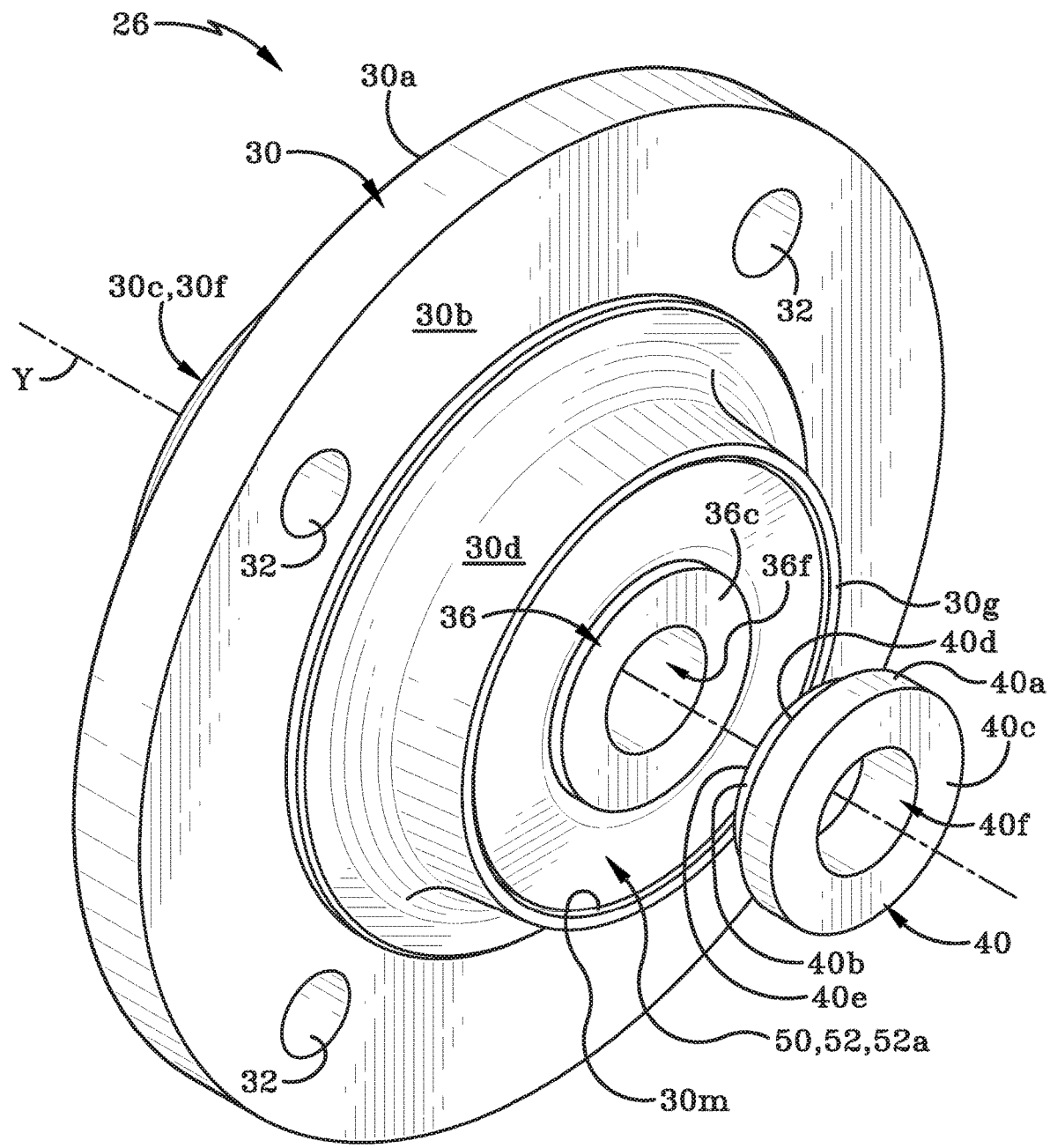
FIG. 4 is a perspective view of a second side of the bearing assembly.
Figure 5:
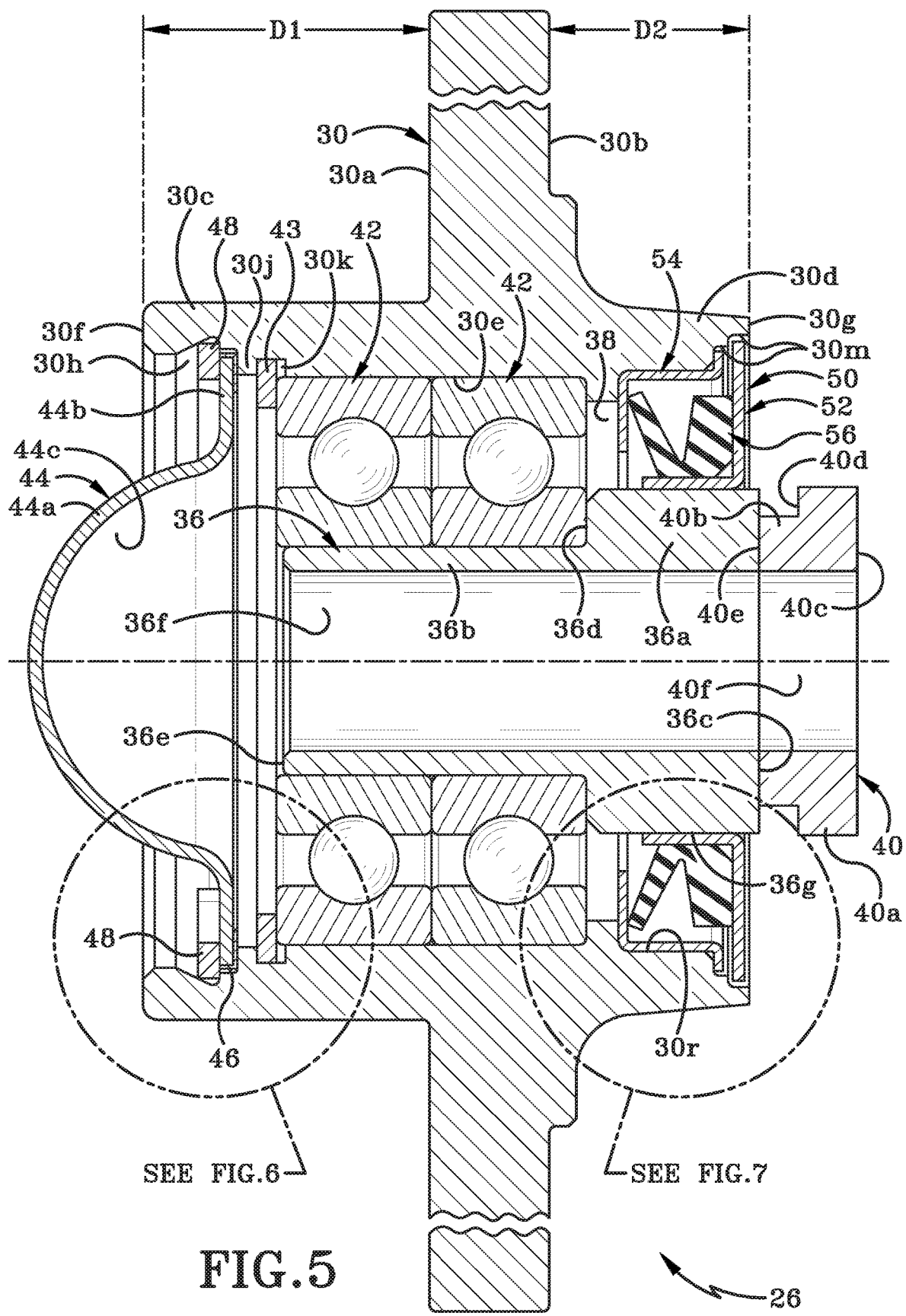
FIG. 5 is a cross-section taken along line 5-5 of FIG. 3.

Referring to FIGS. 3-8 and particularly to FIG. 5, first bearing assembly 26 may comprise an annular hub 30. Hub 30 may be a central disc that has a first surface 30a and an opposed second surface 30b that are generally oriented parallel to each other. A first flange 30c extends outwardly from first surface 30a in a first direction. A second flange 30d extends outwardly from second surface 30b in a second direction that is opposite to the first direction. In one example, one or both of the first flange 30c and the second flange 30d is an annular flange. The central disc of hub 30 may have an exterior circumferential wall that extends between first surface 30a and second surface 30b. The exterior circumferential wall of hub 30 may be of a greater circumference than a circumference of one or both of first flange 30c and second flange 30d. In one example, first and second flanges 30c and 30d may be of generally the same circumference as each other.

The central disc of hub 30 may have an interior surface that bounds and defines a bore. Additionally, an interior surface of first flange 30c and an interior surface of second flange 30d may bound and define bores that are substantially continuous with the bore defined by the central disc. This substantially continuous bore that extends from an outermost end 30f of first flange 30c to an outermost end 30g of second flange 30d will be referred to with the reference number 30e. Outermost end 30f of first flange 30c may be spaced a first distance "D1" (FIG. 5) away from first surface 30a and outermost end 30g of second flange 30d may be spaced a second distance "D2" away from second surface 30b. The distance "D1" may be greater than the distance "D2".

Figure 6:
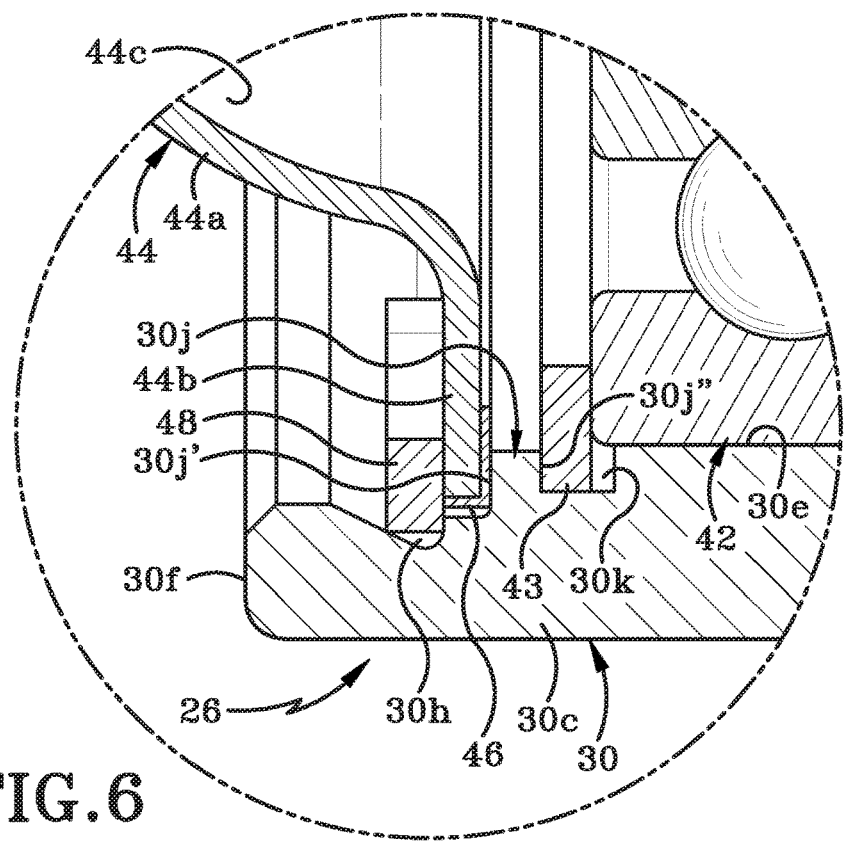
FIG. 6 is an enlargement of a first highlighted region of FIG. 5.

As best seen in FIGS. 3, 5 and 6, the interior surface of first flange 30c that defines a portion of bore 30e may be shaped to include an interior profile that is located proximate outermost end 30f. In particular, the interior surface may define an annular first groove 30h that is positioned a short distance inwardly from outermost end 30f and may further define an annular second groove 30k spaced a further distance inwardly from outermost end 30f. An annular ridge 30j may be provided between first groove 30h and second groove 30k. Ridge 30j may further define a first shoulder 30j' that faces first groove 30h and a second shoulder 30j" that faces second groove 30k. The purpose of the first and second grooves 30h, 30k and the ridge 30j will be described later herein.

Figure 7:
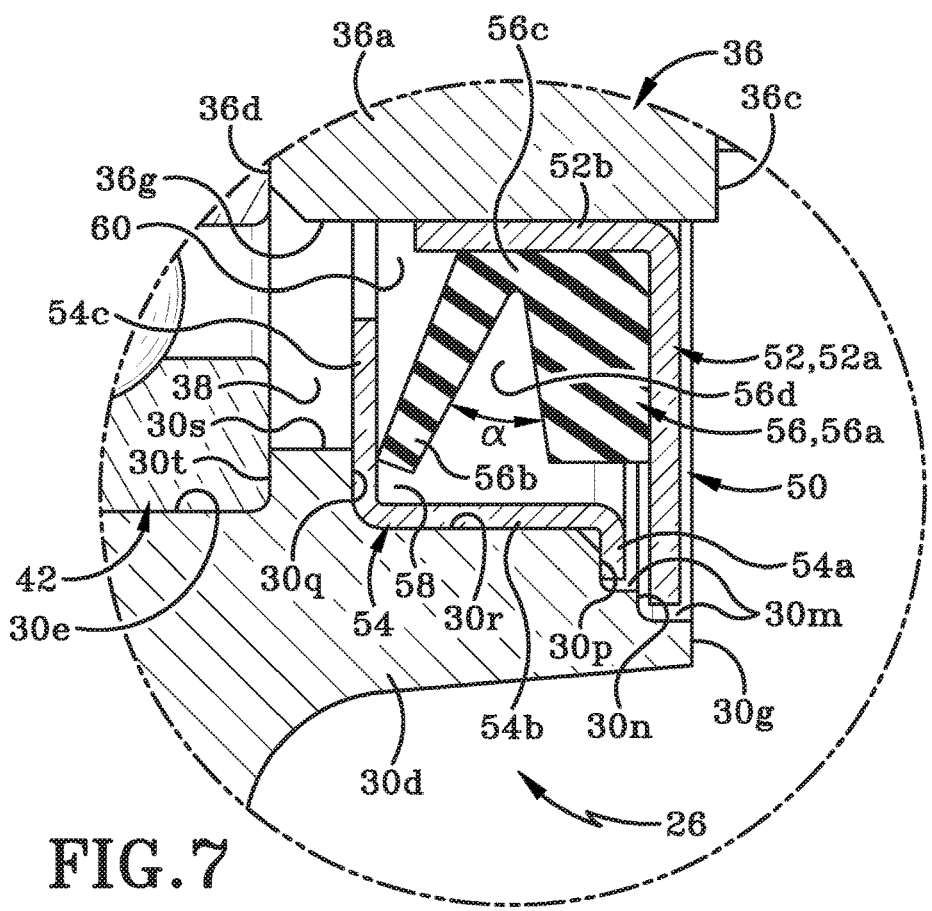
FIG. 7 is an enlargement of a second highlighted region of FIG. 5.

As best seen in FIGS. 3, 5 and 7, the interior surface of second flange 30d that defines another portion of bore 30e may also be shaped to include an interior profile that is located proximate outermost end 30g. The interior surface of second flange may define one or more annular recesses 30m proximate outermost end 30g. Two recesses 30m are illustrated in the attached figures and recesses 30m may be of different diameter with the outermost recess that is located closest to outermost end 30g being of a greater diameter (and therefore circumference) than a diameter of the second recess 30m that is located a greater distance away from outermost end 30g. The interior surface of second flange 30d also defines a first interior circumferential surface 30r (FIG. 7) and a second interior circumferential surface 30s. First interior circumferential surface 30r is of a smaller diameter than the second recess 30m but is of a greater diameter than second interior circumferential surface 30s. Second interior circumferential surface 30s is of a greater diameter than the portion of bore 30e defined in the central disc of hub 30 and continuing through to annular groove 30k.

The interior surface of second flange 30d additionally defines a first annular shoulder 30n, a second annular shoulder 30p, a third annular shoulder 30q, and a fourth annular shoulder 30t that are best seen in FIG. 7. The first annular shoulder 30n is located between the outermost first recess 30m and the innermost second recess 30m. The second annular shoulder 30p is located between the innermost second recess 30m and the first interior circumferential surface 30r. The third annular shoulder 30q is located between the first interior circumferential surface 30r and the second interior circumferential surface 30s. The fourth annular shoulder 30t is located between the second interior circumferential surface 30s and the portion of the bore 30e defined in the central disc of hub 30. The purpose of the first and second recesses 30m, the circumferential surfaces 30r, 30s, and the shoulders 30n, 30p, 30q, and 30t will be described later herein.

FIGS. 3 and 4 show that the central disc of hub 30 surrounding first flange 30c and second flange 30d may define a plurality of spaced-apart through-holes 32 therein. Each hole 32 may extend from front surface 30a through to back surface 30b. Holes 32 may be located equidistantly from each other around the associated one of the first and second flanges 30c, 30d. Holes 32 may be positioned to receive a plurality of fasteners 34 (FIG. 2) therethrough that may be used to secure first bearing assembly 26 to second leg 18b of one of the mounting brackets 18.

As shown in FIGS. 4 and 5, a bearing sleeve 36 is provided as part of first bearing assembly 26. Bearing sleeve 36 may be shaped and sized to be received within bore 30e of hub 30. Bearing sleeve 36 may comprise a first annular region 36a and a second annular region 36b, where second annular region 36b may be of a lesser diameter than first annular region 36a. First annular region 36a may extend from a first face 36c to a shoulder 36d. Second annular region 36b may extend from the shoulder 36d to a second face 36e. Bearing sleeve 36 may be oriented in bore 30e in such a way that first face 36c of first annular region 36a may be located generally in alignment with outermost end 30g of second flange 30d.

An interior surface of first and second regions 36a, 36b of bearing sleeve 36 may define a bore 36f. Bore 36f may extend from first face 36c through to second face 36e and may be of a generally constant diameter from first face 36c through to second face 36e. Bore 36f may be shaped and sized to receive one of the narrower diameter ends 22b, 22c of shaft 22 therein. For example, first end 22b of shaft 22 is shown engaged in bore 36f in FIG. 8. First region 36a of bearing sleeve 36 may further include an exterior circumferential surface 36g (FIGS. 5, 7 and 8) that may be positioned generally opposite the first interior circumferential surface 30r of hub 30. Exterior surface 36g may be separated from first interior circumferential surface 30r and a portion of second interior circumferential surface 30s by an annular space that is identified in FIG. 7 by the reference number 38.

Figure 8:
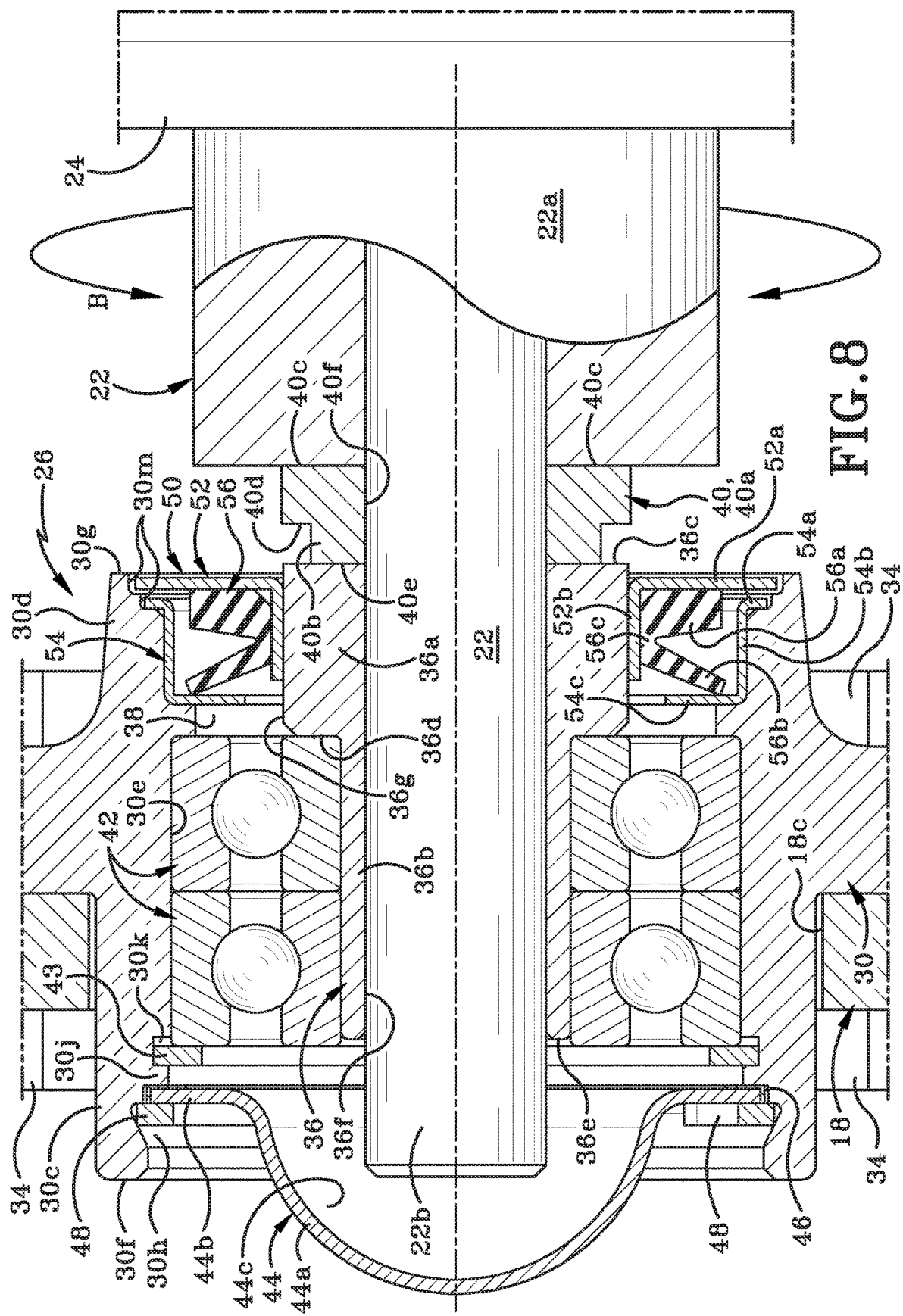
FIG. 8 is cross-section of the bearing assembly and a portion of the tilling equipment taken along line 8-8 of FIG. 2.

FIGS. 4, 5, and 8 show a flange washer 40 that may be positionable adjacent a first end of the bearing sleeve 36. Flange washer 40 may comprise a first region 40a and a second region 40b. First region 40a may be of a greater diameter than the second region 40b. First region 40a may include a first face 40c and a shoulder 40d spaced from first face 40c. Second region 40b may extend from shoulder 40d to a second face 40e. An interior surface of flange washer 40 may define an aperture 40f therethrough that extends from first face 40c through to second face 40e. Aperture 40f may be of generally a same diameter as bore 36f of bearing sleeve 36. First end 22b of shaft 22 may be passed through an opening in first face 40c of flange washer 40 and into aperture 40f and then out of an opening in second face 40e of flange washer 40 and into an opening to bore 36f defined in first face 36c of bearing sleeve 36. Flange washer 40 may aid in retaining first end 22b of shaft 22 in bearing assembly 26.

One or more bearings 42 may be positioned between an exterior surface of second annular region 36b of bearing sleeve 36 and an interior surface of hub 30 that defines bore 30e. Each bearing 42 may be completely sealed and may be inserted into bore 30e such that one of the bearings 42 abuts the shoulder 36d of bearing sleeve 36. Bearings 42 may be secured or retained in place by an annular retaining ring 43 (FIG. 5) that may be received within annular groove 30k of hub 30. Ring 43 may abut shoulder 30j″ of ridge 30j. The one or more bearings 42 may thus be retained between shoulder 36d of bearing sleeve 36 and retaining ring 43. The one or more bearings 42 may ensure that bearing sleeve 36 is able to rotate reasonably freely relative to hub 30. Since hub 30 may be secured to mounting bracket 18 by fasteners 34, during operation of attachment 10, the hub 30 and flanges 30c, 30d may remain substantially stationary along with mounting bracket 18 while bearing sleeve 36 may be selectively rotated about longitudinal axis "Y" within bore 30e and relative to hub 30. The selective rotational motion of shaft 22 and therefore of bearing sleeve 36 (which rotates in unison with shaft 22) is indicated in FIG. 8 by the arrow "B"

FIGS. 3, 5 and 8 show that a dust cap 44, in accordance with an aspect of the disclosure, extends across one end of bore 30e of hub 30 and closes off access thereto. Dust cap 44 may comprise a hemispherical region 44a that may be generally convex in shape and terminate at a bottom edge. Dust cap 44 may further comprise an annular flange 44b that may extend radially outwardly from the bottom edge of hemispherical region 44a. Annular flange 44b may be an annular gasket that is directly fused to hemispherical region 44a so that dust cap 44 is an integrally formed, unitary, and monolithic component. The gasket may be fabricated from any suitable material, such as rubber.

Annular flange 44b may have a generally planar interior face that may be seated in groove 30h of hub 30. At least a portion of flange 44b may be positioned against first shoulder 30j′ of annular ridge 30j. A retaining member may be positioned between first shoulder 30j′ and flange 44b. This retaining member may comprise an annular retaining ring 46 (FIG. 6) that is substantially L-shaped in cross-sectional profile. Ring 46 may be engaged with a circumferential edge of flange 44b and be positioned between shoulder 30j′ and flange 44b.

FIGS. 3 and 6 show that another retaining member may be seated in groove 30h adjacent an exterior face of flange 44b. This retaining member may comprise a C-shaped snap ring 48 that may be seated in groove 30h adjacent an exterior face of flange 44b. Flange 44b may therefore be retained between snap ring 48 and retaining ring 46 and may thereby be substantially prevented from exiting bore 30e of hub 30. Hemispherical region 44a may bulge outwardly away from one end of hub 30 and bound and define an interior space 44c (FIG. 5) that is in fluid communication with bore 30e. First end 22b of shaft 22 may be received through bore 30e from the opening in second flange 30f and may extend inwardly through bore 30e and into interior space 44c. Dust cap 44 thus seals off a first opening to bore 30e (i.e., the first opening defined by first flange 30c) and thereby substantially prevents soil, dust, plant material, stones etc. from entering bore 30e from the first-flange-side of hub 30. It will be understood that dust cap 44 may be secured in any number of other different ways to hub 30 from what is described above. For example, screw-type fasteners may be utilized for this purpose.

As shown in FIG. 5, a guard assembly 50 may be provided in the space 38 defined between the interior surface of second annular flange 30d and the exterior surface 36g of first region 36a of bearing sleeve 36. Guard assembly 50 may comprise at least an annular plate 52, a cup-shaped member 54, and a sealing member 56.

Annular plate 52 may be generally L-shaped in cross-section and include a first leg 52a that may be seated in outermost annular first recess 30m and against first shoulder 30*n*. Plate 52 may have a second leg 52*b* that may be located adjacent to exterior surface 36*g* of bearing sleeve 36. Second leg 52*b* may be welded or otherwise secured to exterior surface 36*g* of bearing sleeve 36.

Cup shaped member 54 may comprise a generally S-shaped annular cup-shaped member 54 that includes a first arm 54*a*, a second arm 54*b*, and a third arm 54*c*. First arm 54*a* may be generally oriented at right angles to second arm 54*b*. Second arm 54*b* may be generally oriented at right angles to third leg 54*b*. Cup-shaped member 54 may be engaged with a complementary shaped region of the interior surface of second flange 30*d*. Cup-shaped member 54 may be seated within space 38 in such a way that first arm 54*a* may be received in the annular second recess 30*m* that is located adjacent the annular first recess 30*m* in which first leg 52*a* of plate 52 may be seated. First arm 54*a* of cup-shaped member 54 may abut second shoulder 30*p* of second flange 30*d*. Second arm 54*b* of cup-shaped member 54 may abut first interior circumferential surface 30*r* of hub 30 and third arm 54*c* of cup-shaped member 54 may be seated against annular shoulder 30*q*. Cup-shaped member 54 may be welded or otherwise secured to first interior circumferential surface 30*r* and to the shoulders 30*n*, 30*p*, and 30*q*. First arm 54*a* of cup-shaped member 54 and third arm 54*c* thereof may be oriented generally parallel to first leg 52*a* of L-shaped annular ring 52. Second arm 54*b* may be oriented parallel to second leg 52*b* of L-shaped annular ring 52.

Sealing member 56 may be provided between plate 52 and cup-shaped member 54. Sealing member 56 may comprise an annular ring that may be generally V-shaped in cross-section as may be seen from FIG. 7. Sealing member 56 may comprise a first region 56*a* and a second region 56*b* that may be joined together by a bridge 56*c*. First region 56*a* may be secured to the first leg 52*a* and to second leg 52*b* of plate 52. In particular, first region 56*a* may be seated within a corner region where first leg 52*a* and second leg 52*b* intersect. Bridge 56*c* may be secured to second leg 52*b* and a first end of second region 56*b* may be secured to bridge 56*c* and to second leg 52*b*. Second region 56*b* may angle away from first region, at an angle α (FIG. 7), such that a space 56*d* may be defined between first region 56*a* and second region 56*b*. The angle α may be an acute angle, i.e., less than ninety degrees. A free end of second region 56*b* of sealing member 56 may contact third arm 54*c* of cup-shaped member 54. It should be noted that second region 56*b* of sealing member 56 preferably is of a length that is not sufficiently long enough to enable second region 56*b* to extend downwardly and touch second arm 54*b* of cup-shaped member 54.

The second end of the first region 56*a* of sealing member 56 may be spaced a distance away from the second arm 54*b* of cup-shaped member 54 and may also be spaced a distance away from third arm 54*c* of cup-shaped member 54. Second end of the second region 56*b* of sealing member 56 may be spaced a distance away from second arm 54*b* but may be in contact with third arm 54*c* of cup-shaped member 54. Consequently, as shown in FIG. 7 a space 58 may be defined between the second ends of first region 56*a* and second region 56*b* and the second arm 54*b*. The contact between the second end of second region 56*b* of sealing member 56 and third arm 54*c* of cup-shaped member 54 seals off space 58 from an annular gap 60 that may be defined between the ends of second leg 52*b* and third arm 54*c*. First leg 52*a* of plate 52 and first arm 54*a* of cup-shaped member and second region 56*b* of sealing member 56 may thereby substantially close off the space 38 defined between bearing sleeve 36 and the interior surface of hub 30. Sealing member 56, particularly second region 56*b* thereof, may aid in preventing dust, debris, plant material etc., from entering the interior of bore 30*e* defined by hub 30, and may particularly prevent various types of debris from entering bore 30*e* through gap 60.

FIG. 8 shows first bearing assembly 26 engaged with a second leg 18*b* of mounting bracket 18 and further shows first end 22*b* of shaft 22 received into bore 36*f* of bearing sleeve 36 of first bearing assembly 26. Dust cap 44 may effectively seal off a first opening to bore 30*e* defined in first annular flange 30*c*. Dust cap 44 may further effectively seal off an opening to bore 36*f* of bearing sleeve 36. Guard assembly 50 may effectively seal off a second opening to bore 30*e* defined in second annular flange 30*d*. Dust cap 44 and guard assembly 50 may therefore individually and together aid in ensuring that little to no dust, soil, stones, plant material, and other debris enters the interior of first bearing assembly 26 and interferes with the rotation of bearing sleeve 36 relative to hub 30.

It will be understood that while a particular configuration of frame 14, crossbar 16, mounting brackets 18, and clamping rods 20 has been disclosed herein, any other suitable configuration of frame 14, crossbar 16, mounting brackets 18, and clamping rods 20 may be utilized when configuring attachment 10. The specific configuration shown in the attached figures is by way of example only and should not be regarded as unnecessarily limiting the scope of the present disclosure. Similarly, the features of the present disclosure may be utilized on any of a wide variety of different rotary attachments or tilling attachments other than the specific attachment illustrated herein. Attachment 10 as illustrated in the attached figures may comprise a tiller-type of attachment or any other type of rotatable attachment that is used to work the soil, harvest crops, and cut back plant material, etc. The specific attachment 10 shown and described herein should be understood to be representative of the type of attachments that may incorporate the present invention and should not be regarded as unnecessarily limiting the scope of the present disclosure.

While the bearing assembly has been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A bearing assembly comprising:
   a hub having an interior surface that defines a first bore; wherein a first end of the hub defines a first opening to the first bore and a second end of the hub defines a second opening to the first bore;
   a bearing sleeve having an interior surface that defines a second bore, wherein a first end of the bearing sleeve defines a first opening to the second bore; and a second end of the bearing sleeve defines a second opening to the second bore; wherein the bearing sleeve is received in the first bore such that the first end of the bearing sleeve is proximate the first end of the hub; and wherein the bearing sleeve is adapted to receive a first end of a rotatable shaft in the second bore;
   at least one bearing positioned in the first bore between a portion of the bearing sleeve and a portion of the interior surface of the hub;
   a first sealing mechanism provided at the first end of the hub; and
   a second sealing mechanism provided at the second end of the hub;

wherein said second sealing mechanism seals off the second opening to the first bore and the second opening to the second bore;

wherein the second sealing mechanism comprises a dust cap engaged with the second end of the hub and extending across the second opening to the first bore;

wherein the dust cap includes a hemispherical region; and an annular flange extending radially outwardly from a base of the hemispherical region; and wherein the annular flange comprises a rubber gasket that is fused to the hemispherical region.

2. The bearing assembly as defined in claim 1, wherein the first sealing mechanism is seated in the first bore and circumscribes an exterior surface of the first end of the bearing sleeve.

3. The bearing assembly as defined in claim 1, further comprising a flange washer positioned adjacent a first end of the bearing sleeve; and wherein an interior surface of the flange washer defines an aperture, and wherein the flange washer is adapted to receive the first end of the rotatable shaft through the aperture.

4. The bearing assembly as defined in claim 1, wherein the first sealing mechanism comprises a guard assembly that extends between the interior surface of the hub and an exterior surface of the bearing sleeve.

5. The bearing assembly as defined in claim 4, wherein the guard assembly comprises:
   an L-shaped annular ring having a first leg and a second leg that meet at a corner.

6. The bearing assembly as defined in claim 5, wherein the first leg extends between the exterior surface of the bearing sleeve and the interior surface of the hub.

7. The bearing assembly as defined in claim 6, wherein the second leg is operatively engaged with the exterior surface of the bearing sleeve.

8. The bearing assembly as defined in claim 5, wherein the guard assembly further comprises:
   a sealing member engaged in the corner of the L-shaped annular ring and extending outwardly from the second leg and towards the interior surface of the hub.

9. The bearing assembly as defined in claim 8, wherein the sealing member is a V-shaped sealing member comprising a first region and a second region; and wherein a first end of the first region and a first end of the second region are operatively engaged with the second leg of the L-shaped annular ring.

10. The bearing assembly as defined in claim 9, wherein the first end of the first region and the first end of the second region are engaged with each other via a bridge; wherein the first region and the second region are oriented at an angle relative to each other and define a gap between them.

11. The bearing assembly as defined in claim 9, wherein each of the first region and the second region has a second end that is spaced from the first end thereof; and wherein a space is defined between the interior surface of the hub and the second end of each of the first region and the second region.

12. The bearing assembly as defined in claim 11, wherein the guard assembly further comprises a cup-shaped member engaged with the interior surface of the hub; and wherein the second end of each of the first region and the second region extends towards the cup-shaped member.

13. The bearing assembly as defined in claim 12, wherein the cup-shaped member is S-shaped and is secured to a complementary shaped region of the interior surface of the hub.

14. The bearing assembly as defined in claim 13, wherein the second end of the first region is spaced from the second arm and from the third arm.

15. The bearing assembly as defined in claim 13, wherein the cup-shaped member includes a first arm, a second arm and a third arm; wherein the first arm and the third arm are substantially parallel to the first leg of the L-shaped annular ring; and the second arm is parallel to the second leg of the L-shaped annular ring.

16. The bearing assembly as defined in claim 15, wherein the second end of the second region is spaced from the second arm and contacts the third arm.

17. The bearing assembly as defined in claim 1, wherein the bearing sleeve comprises a tubular member including a first annular region and a second annular region that extends longitudinally outwardly from the first annular region, wherein second annular region is of a lesser diameter than the first annular region.

18. The bearing assembly as defined in claim 17, wherein the first end of the bearing sleeve is provided on the first annular region and the second end of the bearing sleeve is provided on the second annular region.

19. The bearing assembly as defined in claim 17, wherein the first sealing member circumscribes the first annular region of the bearing sleeve.

20. A bearing assembly comprising:
   a hub having an interior surface that defines a first bore; wherein a first end of the hub defines a first opening to the first bore and a second end of the hub defines a second opening to the first bore;
   a bearing sleeve having an interior surface that defines a second bore, wherein a first end of the bearing sleeve defines a first opening to the second bore; and a second end of the bearing sleeve defines a second opening to the second bore; wherein the bearing sleeve is received in the first bore such that the first end of the bearing sleeve is proximate the first end of the hub; and wherein the bearing sleeve is adapted to receive a first end of a rotatable shaft in the second bore;
   at least one bearing positioned in the first bore between a portion of the bearing sleeve and a portion of the it surface of the hub;
   a first sealing mechanism provided at the first end of the hub;
   a second sealing mechanism provided at the second end of the hub; wherein said second sealing mechanism seals off the second opening to the first bore and the second opening to the second bore;
   wherein the second sealing mechanism comprises a dust cap engaged with the second end of the hub and extending across the second opening to the first bore;
   wherein the dust cap includes a hemispherical region; and an annular flange extending radially outwardly from a base of the hemispherical region; and
   wherein the interior surface of the hub defines an annular groove therein and the annular flange of the dust cap is received in the annular groove; and wherein the bearing assembly further comprises a retaining member that is engageabie in the annular groove and retains the annular flange in engagement with a shoulder provided in the interior surface of the hub.

* * * * *